March 29, 1932.   E. G. GUNN   1,851,357
BRAKE
Filed April 17, 1929   2 Sheets-Sheet 1
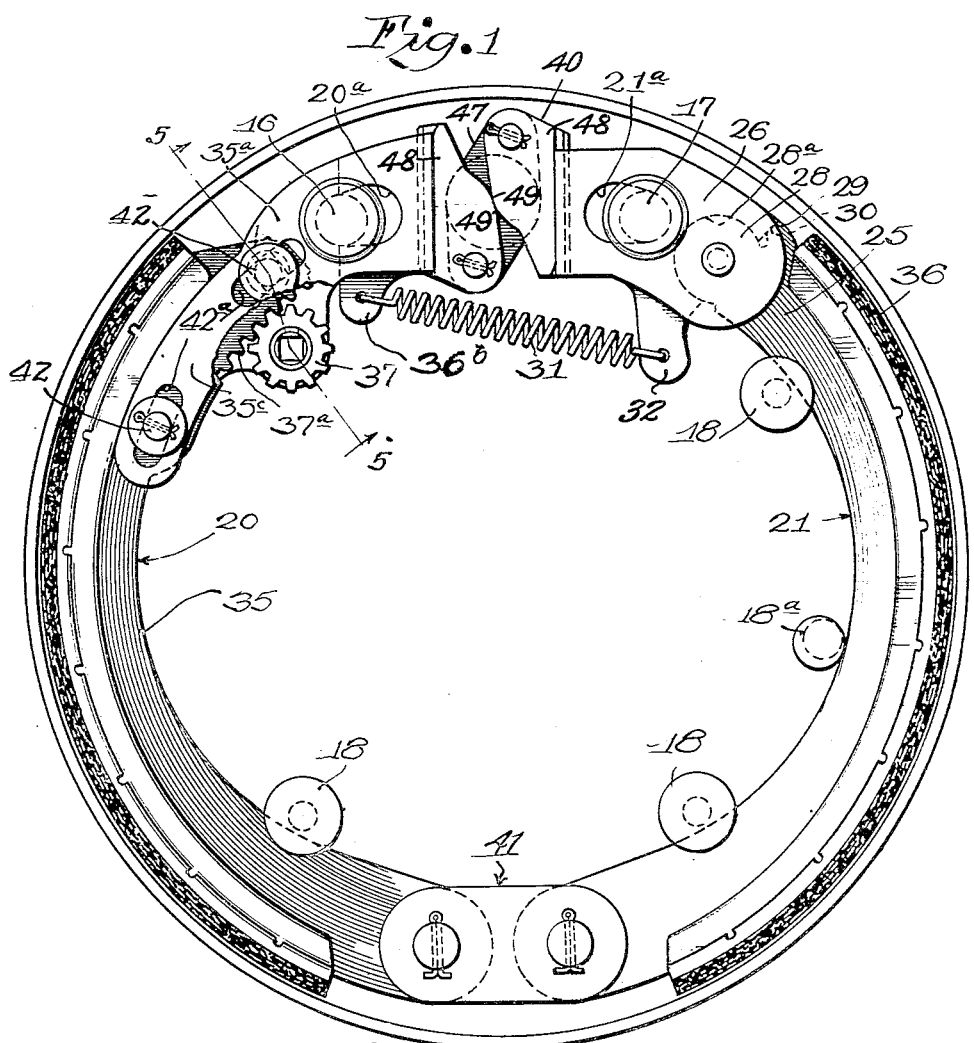
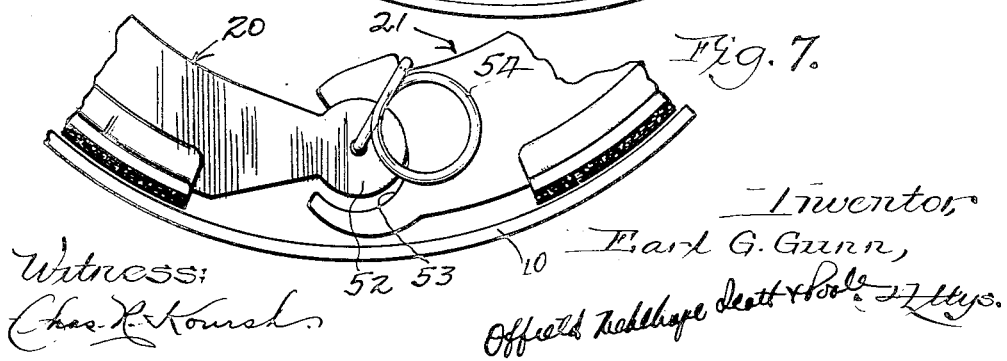

March 29, 1932.  E. G. GUNN  1,851,357
BRAKE
Filed April 17, 1929   2 Sheets-Sheet 2
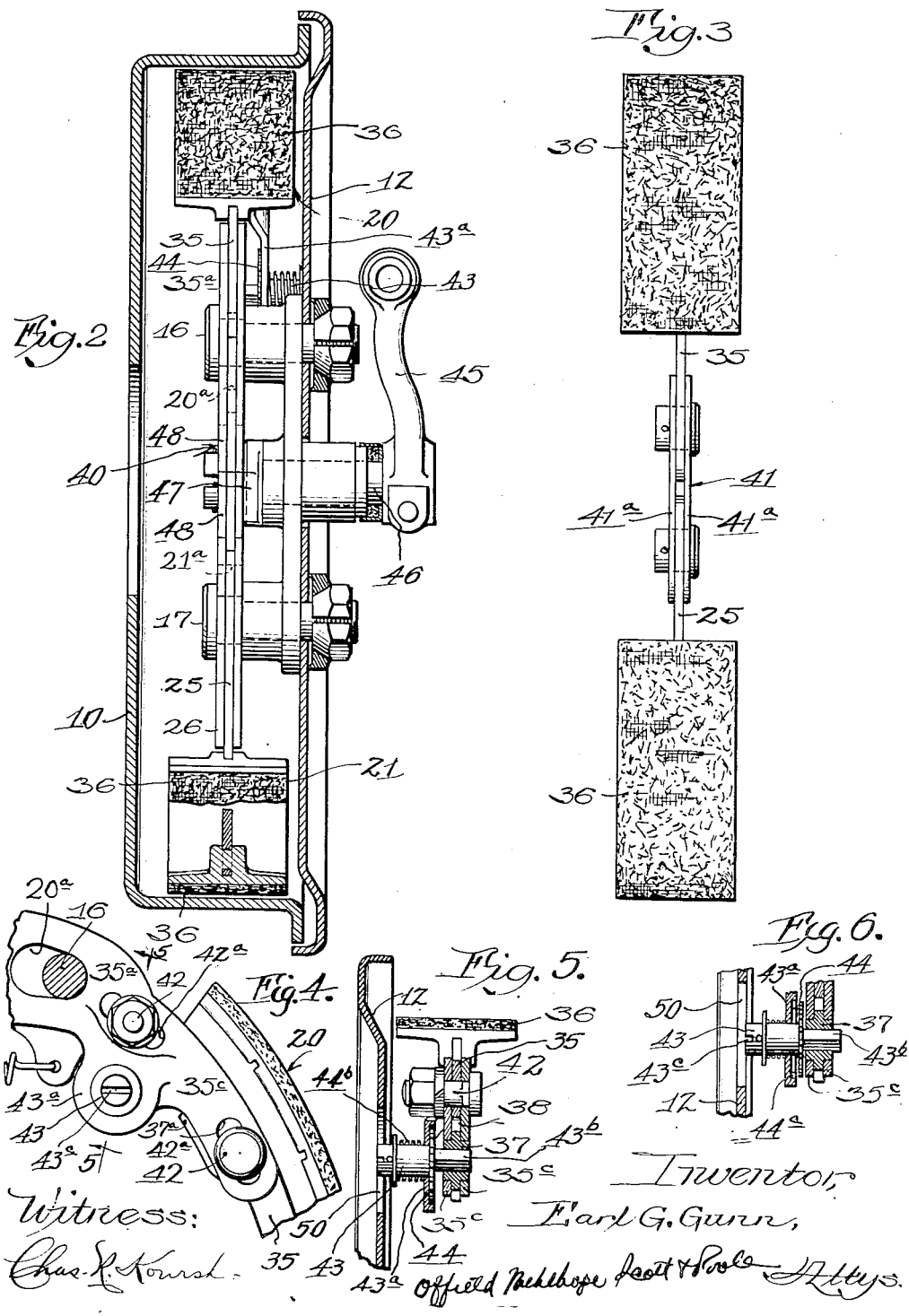

Patented Mar. 29, 1932

1,851,357

UNITED STATES PATENT OFFICE

EARL G. GUNN, OF RACINE, WISCONSIN, ASSIGNOR TO THE NASH MOTORS COMPANY, OF KENOSHA, WISCONSIN, A CORPORATION OF MARYLAND

BRAKE

Application filed April 17, 1929. Serial No. 355,791.

This invention relates to improvements in brake construction for motor vehicles, and more particularly to internal brake shoes having servo action.

The principal object of the invention is to provide an improved and simplified means for adjusting the brakes.

A further object is to provide an improved and simplified construction whereby the brake shoes may automatically position themselves properly relative to the brake drum when in operation.

Other novel features of construction will appear from time to time as the following description proceeds.

In carrying out my invention, I utilize certain novel features of construction heretofore broadly disclosed in prior application bearing Serial No. 343,585 filed March 1, 1929, wherein a two-shoe brake of the servo type is arranged for operation in either direction of rotation of the wheel, but with an improved and simplified construction of parts, as will hereinafter more fully appear.

The invention may best be understood by reference to the accompanying drawings, in which Figure 1 is a face view of a brake constructed in accordance with my invention, with parts broken away to show certain details of construction.

Figure 2 is a detail top plan view of the brake shown in Figure 1 with parts shown in section.

Figure 3 is a detail bottom plan view of the brake band and connecting links.

Figure 4 is a fragmentary detail of the adjusting device with the backing plate removed.

Figure 5 is a section taken on line 5—5 of Figure 1.

Figure 6 is a view similar to Figure 5, but showing the pinion in unlocked position.

Figure 7 is a fragmentary view showing a modified form of connection between the two brake shoes.

Referring now to details of the drawings, the general construction is similar to that disclosed in my copending application, Serial No. 343,585 and comprises a brake drum 10 carried by the wheel in the usual manner and the backing plate 12 is mounted on the wheel spindle (not shown) having the braking mechanism carried thereon.

The braking mechanism shown herein comprises two shoes 20 and 21 arranged in reversed position relative to each other and having slotted engagement with anchors 16 and 17 respectively so as to permit servo action in either direction of rotation of the wheel, as will presently appear.

An auxiliary pivotal connection is provided adjacent the anchored end of shoe 21 so as to permit the main part of the shoe carrying the brake lining 36 to position itself relative to the drum when the brake is applied. This pivotal connection is provided between a link 26 forming the anchored end of the shoe 21 and the shoe web 25 of the main portion of shoe 21. In the form shown, said shoe web has a circular portion 28 hinged in a recessed portion 28a of the link 26.

When the brake is in idle postion, a stop 29 on web 25 is held in engagement with the end surface 30 of the link 26. The brake is held in contracted or idle position by suitable means, such as a spring 31, connected from an ear 32 projecting inwardly from the hinged end of link 26. The opposite end of spring 31 is connected to an ear 36b on the opposite shoe 20, as will hereinafter more fully be described.

One or more eccentric centering devices 18a may also be provided, if desired, to control the idle position of the shoe, as for instance, shoe 21, as shown.

The shoes 20 and 21 are maintained in contracted position against stops 18—18 carried by the backing plate and suitably disposed within the shoes.

Braking pressure is applied by an equalizer device indicated generally at 40, disposed between the anchored ends of the shoes 20 and 21. The equalizer device 40 is operated by lever 45 on the opposite side of backing plate 12 connected to a shaft 46 extending through said backing plate and having a cross arm 47 thereon. A pair of equalizer links 48—48 are pivotally mounted at opposite ends of the cross arm 47, said equalizer links being each provided with opposed curved surfaces 49—49 which normally engage each other on a line coincident with the axis of the operating shaft 46, as shown in Figure 1. The arrangement is such that by rotation of the operating shaft 46, the equalizer links 48—48 may be spread more in one direction than the other, depending upon the direction of rotation of the drum, but with said equalizer links transmitting substantially equal pressure on the ends of the brake shoes through the rolling action of the mutually engaged surfaces 49—49, as described.

Referring now to features of construction which form the subject matter of this invention, it will be observed that the unanchored ends of shoes 20 and 21 are pivotally connected by a link 41, herein comprising a pair of plates 41a—41a on opposite sides of the shoe webs (see Figure 3). The shoes are adjusted relative to the drum by a device preferably disposed adjacent the anchored end of shoe 20 to lengthen or shorten the effective length of the latter. This adjusting device consists of a member 35a which forms the anchored end of the shoe 20 and is provided with a pair of spaced plates 35c—35c which overlap opposite sides of the web 35 of the main part of shoe 20. The plates 35c—35c are slidable circumferentially relative to said web 35 and are moved by means of a pinion 37 mounted between plates 35c—35c and meshing with rack teeth 37a formed on the web 35 adjacent its end. The parts are guided for circumferential movement by suitable means, such as pins 42—42 carried by the web 35 and movable in slots 42a—42a arranged circumferentially of the plates 35c—35c.

The pinion 37 is actuated by means of a shaft 43 having bearing support in an ear 43a carried by member 35a at one side of the web 35, and having a squared end 43b fitting in said pinion. Said shaft is shiftable longitudinally relative to the ear 43a and pinion 37. A collar 44 having a series of gear teeth is carried on said shaft beneath the ear 43a, the entire shaft and collar being normally under tension of coil spring 44b on the outer end of said shaft so as to force the teeth of collar 44 into engagement with locking projections 44c carried on the inner side of said ear (see Figure 6). The arrangement is such that the pinion 37 and the rack teeth 38 are normally held in locked position, but may be unlocked by forcing the shaft 43 inwardly by means of a suitable tool, as for instance, a screw driver, which may be inserted through aperture 50 in the backing plate (see Figure 5) and applied in slot 43c so as to move the collar 44 out of locked position, as shown in Figure 6. When thus unlocked, the pinion 37 may be rotated to any desired position of adjustment. Upon release of the pressure upon shaft 43, the collar 44 will automatically reassume its locked postion by action of the spring 44b, as soon as the collar is rotated slightly to a position where its teeth register with the locking projections 44c.

In the modified form of joint shown in Figure 7, a connection between the unanchored ends of shoes 20 and 21 is provided by means of a relatively loose fitting joint, including pivotal member 52 on shoe 20, which fits recess 53 on shoe 21, so as to permit the connected shoes to shift radially a limited distance relative to each other, but said pivot 52 is retained by a relatively light spring 54 which directly connects adjacent parts of the joint and normally holds the part 52 in the upper part of recess 53. This arrangement provides a normally fixed pivotal movement of shoe 20 relative to shoe 21 but when the shoes are in braking position, with the shoe 21 acting as the anchor for shoe 20, the latter shoe may shift outwardly against the relatively light tension of spring 54 and thus automatically position itself relative to the drum.

Although I have shown and described the particular embodiment of my invention, it will be understood that I do not wish to be limited to the exact construction shown and described, but that various changes and modifications may be made without departing from the spirit and scope of my invention.

I claim as my invention:

1. In combination with a servo brake including a system of cooperating shoes, anchor means and applying means therefor, means for adjusting said shoes comprising a circumferentially-telescoping connection between adjacent members of said system, including rack and pinion actuating devices carried by said members, and means for locking said pinion relative to one of said members.

2. In combination with a servo brake including a drum, a backing plate, a system of cooperating shoes, anchor means and applying means therefor, means for adjusting said shoes comprising a circumferentially-telescoping connection between adjacent members of said system, including rack and pinion actuating devices carried by said members and accessible through said backing plate.

3. In a brake, a drum, two connected shoes anchored for servo action in either direction of rotation of said drum, and adjusting means carried by one of said shoes adjacent its anchored end comprising a telescoping connection means for positively moving said connection in either direction to effect the adjustment of both of said shoes and means for locking said connection in any one of several adjusted positions.

4. In a brake, a drum, two connected shoes anchored for servo action in either direction of rotation of said drum, and adjusting means carried by one of said shoes adjacent its anchored end comprising a telescoping connection, rack and pinion actuating devices therefor, and means for locking said connection in any one of several adjusting positions.

5. In combination with a servo brake including a drum, a backing plate, a system of co-operating shoes, anchor means and applying means therefor, a circumferentially telescoping connection between adjacent members of said system including a co-operating rack and pinion and a spring pressed actuating member for said pinion normally locking the latter in fixed position but movable out of locking position to rotate said pinion in either direction.

6. In combination with a servo brake including a drum, a backing plate, a system of co-operating shoes, anchor means and applying means therefor, a circumferentially telescoping connection between adjacent members of said system including a co-operating rack and pinion, said pinion being disposed on an axis intersecting said backing plate, a spring pressed actuating member for said pinion accessible through said backing plate, said actuating member normally locking said pinion, but movable out of locking position to rotate said pinion in either direction.

Signed at Racine this 21st day of March 1929.

EARL G. GUNN.